(No Model.)
J. EVERED.
MOLE TRAP.
No. 285,400. Patented Sept. 25, 1883.
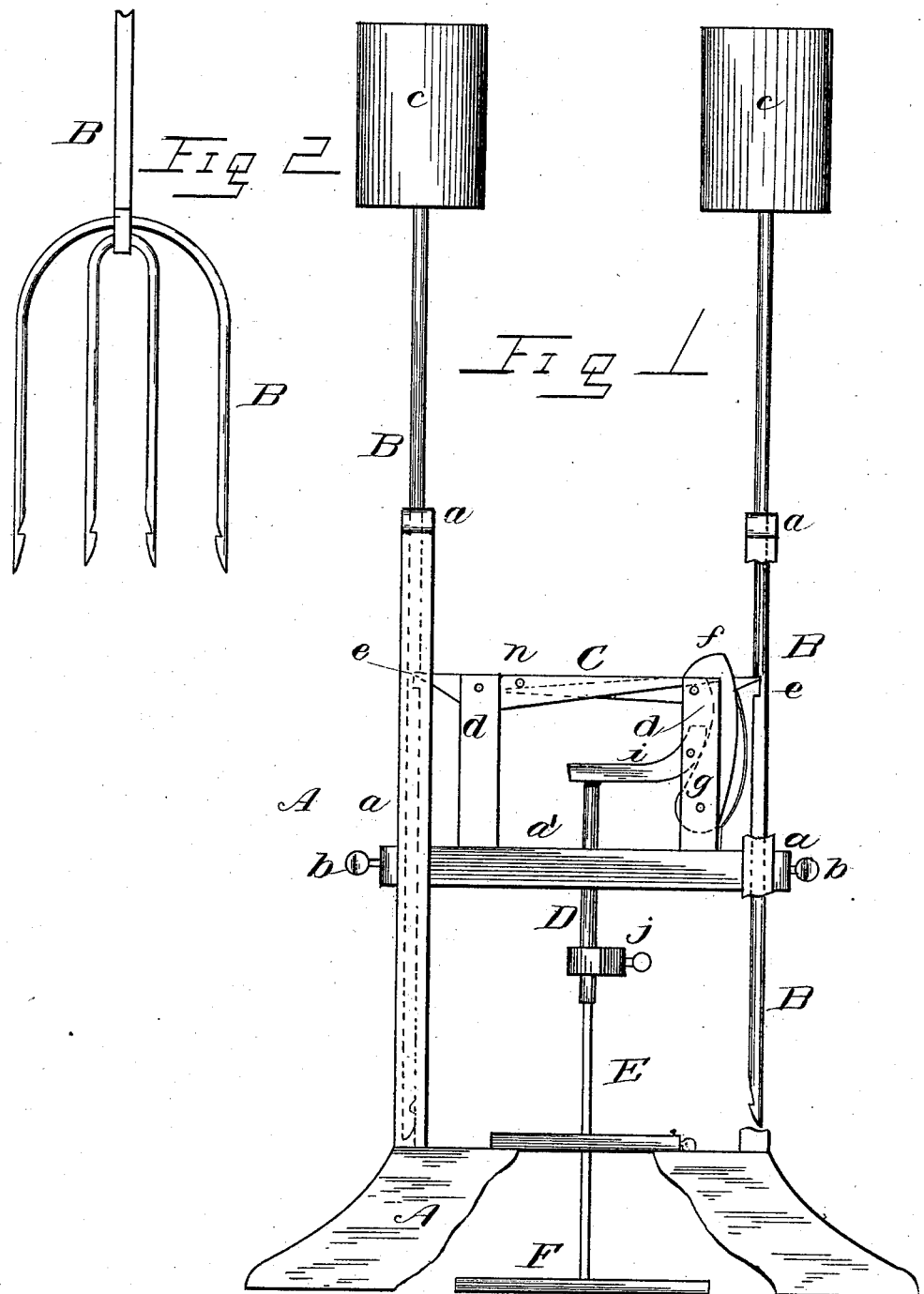
Witnesses:
Wm Duvall
H. E. Bernhard per
Inventor:
John Evered
Edson Bro's,
Atty's.

UNITED STATES PATENT OFFICE.

JOHN EVERED, OF MACY, INDIANA.

MOLE-TRAP.

SPECIFICATION forming part of Letters Patent No. 285,400, dated September 25, 1883.

Application filed July 19, 1883. (No model.)

*To all whom it may concern:*

Be it known that I, JOHN EVERED, a citizen of the United States, residing at Macy, in the county of Miami and State of Indiana, have invented a certain new and useful Improvement in Mole-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention pertains to improvements in animal-traps, particularly to that class for impaling moles or burrowing animals, having for its object to insure the impalement or entrapping of the animal; and it consists of forked or pointed rods with setting and tripping mechanism, substantially as hereinafter fully set forth and claimed.

In the accompanying drawings, Figure 1 is a side elevation of my improved animal-trap with parts broken away. Fig. 2 is a view of one of the forks.

In carrying out my invention I employ a suitable frame, A, mounted upon a platform, and having apertured guiding cross-pieces $a$ and platform $a'$ for the fork-shanks.

B B are the forks or impaling devices, with their shanks or rods adapted to slide in the cross-bars and platform of the frame, as above stated. Holding-screws $b$, applied to the lower cross-bars of the frame A, are used to secure the forks out of the way when not in use. The upper ends of the fork-shanks are weighted. It may be by fixing receptacles $c$ thereto and placing weights in said receptacles; or it may be by affixing the weights directly thereto.

C C are two latches or pointed levers, one being pivoted between the upper ends of uprights $d$, fastened upon the lower cross-bar of the frame A, said latches having pointed ends, adapted to enter notches $e$ in the shanks of the forks, while the opposite end of one lever or latch takes under a spring-catch, $f$, pivoted between uprights $g$, fastened to the lower cross-bar of the frame A. The opposite end of the other latch or lever C takes under a projection, $h$, projecting from one side of its fellow latch or lever C. Between the uprights $g$ is also pivoted a curved cam-lever, $i$, with one end resting against the inner curved surface of the latch $f$ and its opposite end projecting about midway between the uprights $d$ $g$.

D is a sleeve or tubular rod fitted and adjustable by a set-screw, $j$, upon the rod E, reaching through the platform of the frame A, and having its lower end fastened to a board, F, the latter being adapted to rest on the ground. The upper end of the tubular rod D rests against the outer end of the cam $i$.

It will be seen that with the trap set as the burrowing animal or mole raises the earth under the board F the latter will be elevated and cause the rod D to act upwardly on the outer end of the cam $i$, whose opposite end will force the beak of the catch $f$ off the latch C, taking thereunder, the effect of which will be to allow the weighted fork-shanks to liberate themselves from the catches C, when the forks will be instantly plunged into the ground and into the animal, and thus impale or entrap him.

By means of the adjustable sleeve D on the rod E the pressure required to trip the cam $i$ may be varied to render the trap more or less easily operated.

I do not limit myself to the exact form and proportion of parts composing my invention, as I am aware that changes can be made without departing from the principle or sacrificing the advantages of the same. I would therefore have it understood that I claim the right to make such alterations and changes as fairly fall within the scope of my invention—such, for instance, as making lugs on the shanks of the forks in lieu of the notches $e$.

Having thus described my invention, what I claim, and desire to secure by Letters Patent, is—

In an animal-trap, the combination, with the forks and their weighted notched shanks, of the pointed latches, each respectively engaging with one of the fork-shanks, the pivoted spring-catch, and the cam adapted to release the latches and to be operated by the rod connected to a board resting on the ground, substantially as and and for the purpose set forth.

In testimony whereof I affix my signature in presence of two witnesses.

JOHN EVERED.

Witnesses:
JOSHUA COFFING,
SARAH M. CHAMP.